(12) United States Patent
Saranya et al.

(10) Patent No.: US 12,487,219 B2
(45) Date of Patent: Dec. 2, 2025

(54) SYSTEM AND A METHOD OF OPERATING A GAS SENSOR IN A PORTABLE ELECTRONIC DEVICE

(71) Applicants: Robert Bosch GmbH, Stuttgart (DE); Robert Bosch Engineering and Business Solutions Private Limited, Bangalore (IN)

(72) Inventors: Chethanath Saranya, Rodenkirchen (DE); Aibin Paul Lazar, Reutlingen (DE); Richard Fix, Weil Im Schoenbuch (DE)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 295 days.

(21) Appl. No.: 18/248,487

(22) PCT Filed: Sep. 22, 2021

(86) PCT No.: PCT/EP2021/076087
§ 371 (c)(1),
(2) Date: Apr. 10, 2023

(87) PCT Pub. No.: WO2022/089847
PCT Pub. Date: May 5, 2022

(65) Prior Publication Data
US 2023/0393111 A1 Dec. 7, 2023

(30) Foreign Application Priority Data
Oct. 30, 2020 (IN) .............................. 202041047453

(51) Int. Cl.
*G01N 27/04* (2006.01)
*G01N 33/00* (2006.01)
*G06F 1/3215* (2019.01)

(52) U.S. Cl.
CPC ......... *G01N 33/0062* (2013.01); *G01N 27/04* (2013.01); *G06F 1/3215* (2013.01); *G01N 33/0068* (2024.05)

(58) Field of Classification Search
CPC ............... G01N 33/0062; G01N 27/04; G01N 33/0068; G01N 33/0067; G01N 33/0008; G01N 33/0036; G06F 1/3215
See application file for complete search history.

(56) References Cited

U.S. PATENT DOCUMENTS

| | | | |
|---|---|---|---|
| 6,289,288 B1 * | 9/2001 | Kraft | G01N 33/0062 436/164 |
| 9,739,762 B2 | 8/2017 | Schmidlin et al. | |
| (Continued) | | | |

OTHER PUBLICATIONS

International Search Report corresponding to PCT Application No. PCT/EP2021/076087, mailed Jan. 7, 2022 (English language document) (3 pages).

*Primary Examiner* — David J Bolduc
(74) *Attorney, Agent, or Firm* — Maginot, Moore & Beck LLP

(57) ABSTRACT

A gas sensor operates in an ultra-low power mode when a portable electronic device is inactive and in a normal power mode when the device is active. A baseline resistance value of the gas sensor is stored in the ultra-low power mode. The gas sensor transitions to a normal power mode from the ultra-low power mode, when the portable electronic device is active. A rate of stabilization of resistance value of the gas sensor is computed in the normal power mode. A stabilized resistance value of the gas sensor in the normal power mode is estimated using the rate of stabilization of resistance value (Continued)

of the gas sensor in the normal power mode, the baseline resistance value in the ultra-low power mode and a comparison chart of stabilized resistance values of the gas sensor in the ultra-low power mode and the normal power mode.

10 Claims, 3 Drawing Sheets

(56) References Cited

U.S. PATENT DOCUMENTS

| | | | |
|---|---|---|---|
| 2007/0183807 A1* | 8/2007 | Park | G06F 3/1229 399/88 |
| 2014/0216129 A1* | 8/2014 | Schmidlin | G01N 33/0063 73/23.2 |
| 2015/0153754 A1* | 6/2015 | Klosters | G05F 1/66 327/143 |
| 2016/0356752 A1 | 12/2016 | Yocum | |
| 2017/0003238 A1* | 1/2017 | Salvador | G01N 27/125 |
| 2021/0181134 A1* | 6/2021 | Martin | G01N 33/0006 |

* cited by examiner

SYSTEM AND A METHOD OF OPERATING A GAS SENSOR IN A PORTABLE ELECTRONIC DEVICE

This application is a 35 U.S.C. § 371 National Stage Application of PCT/EP2021/076087, filed on Sep. 22, 2021, which claims the benefit of priority to Serial No. IN 202041047453, filed on Oct. 30, 2020 in India, the disclosures of which are incorporated herein by reference in their entirety.

The following specification describes and ascertains the nature of this disclosure and the manner in which it is to be performed:

The present disclosure relates to a system and a method of operating a gas sensor in a portable electronic device. More specifically, it relates to rapidly measuring or estimating the indoor air quality in a portable electronic device.

BACKGROUND

Portable electronic devices such as mobile phones are coming out with lot of new features every day. One of the interesting feature in the recent mobile phones is the measurement of the indoor air quality. Metal oxide sensor used in the mobile phone measure the air quality. However, it requires lot power to heat the metal oxide sensor to measure the air quality through the resistance measurement. When the portable electronic device is active, the metal oxide sensor is in normal power mode or high power mode.

When the portable electronic device is inactive or in sleep mode, the metal oxide sensor is normally in ultra-low power mode. That means the metal oxide sensor is not heated that often. Therefore, the measurement is not done frequently in the low power mode.

However, when the portable electronic device switches from sleep mode to active mode, the metal oxide sensor takes time to get stabilized and to take the measurement. Usually there is a lag or delay in getting accurate the air quality measurement. This will affect user experience of air quality feature.

U.S. Pat. No. 9,739,762B2 discloses a portable sensor device with a gas sensor and low power mode.

SUMMARY

The disclosure discloses a method of operating a gas sensor in a portable electronic device. The gas sensor operates in an ultra-low power mode when the portable electronic device is inactive and the gas sensor operates in a normal power mode when the portable electronic device is active. Data sampling rate is higher in normal power mode compared to the data sampling rate in the ultra-low power mode.

The method involves storing a baseline resistance value of the gas sensor in the ultra-low power mode. The gas sensor transitions to a normal power mode from the ultra-power mode, when the portable electronic device is active.

A rate of stabilization of resistance value of the gas sensor is computed in the normal power mode. A stabilized resistance value of the gas sensor in the normal power mode is estimated based on the rate of stabilization of resistance value of the gas sensor in the normal power mode, the baseline resistance value in the ultra-low power mode and a comparison chart of stabilized resistance values of the gas sensor in the ultra-low power mode and the normal power mode.

The comparison chart of stabilized resistance values of the gas sensor in the ultra-low power mode and normal power mode is created and stored beforehand. The estimated stabilized resistance value of the gas sensor indicates the quality of ambient air. The estimated stabilized resistance value of the gas sensor in the normal power mode is output to a user of the portable electronic device. Once the gas sensor becomes stabilized in the normal power mode, an actual stabilized resistance value of the gas sensor in the normal power mode is output.

The disclosure also discloses an air-quality sensing system for a portable electronic device. In an embodiment of the disclosure, the air-quality sensing system comprises a gas sensor, for example a metal-oxide gas sensor. The gas sensor, the memory and the controller are mounted in the portable electronic device. The gas sensor, the memory and the controller together constitute the air-quality sensing system. The memory and the controller are parts of the portable electronic device.

The air-quality sensing system operates in an ultra-low power mode when the portable electronic device is inactive and the air-quality sensing system operates in a normal power mode when the portable electronic device is active. The memory stores a baseline resistance value of the gas sensor in the ultra-low power mode. The controller transitions the air-quality sensing system to a normal power mode, when the portable electronic device in active. The controller computes rate of stabilization of resistance value of the gas sensor in the normal power mode. The controller estimates a stabilized resistance value of the gas sensor in the normal power mode based on the rate of stabilization of resistance value of the gas sensor in the normal power mode, the baseline resistance value in the ultra-low power mode and a comparison chart of stabilized resistance values of the gas sensor in the ultra-low power mode and the normal power mode. The air-quality sensing system, outputs the estimated stabilized resistance value in the normal power mode. A comparison chart of stabilized resistance value of the gas sensor in the ultra-low power mode and normal power mode is created and stored beforehand in a memory.

In another embodiment of the disclosure, the air-quality sensing system itself is called as the gas sensor. In this embodiment, the memory and the controller are provided within the gas sensor. The gas sensor is mounted to the portable electronic device.

BRIEF DESCRIPTION OF THE DRAWINGS

An embodiment of the disclosure is described with reference to the following accompanying drawing.

DETAILED DESCRIPTION

Figure 1A:
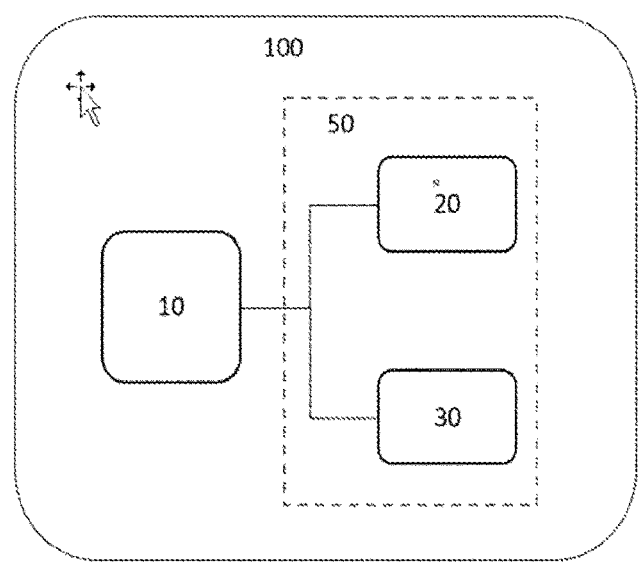
FIG. 1a illustrates a schematic block diagram of air-quality sensing system, according to an embodiment of the present disclosure.

FIG. 1a illustrates a schematic block diagram of air-quality sensing system, according to an embodiment of the present disclosure. In an embodiment of the disclosure, the air-quality sensing system 100 comprises a gas sensor 10, for example a metal-oxide gas sensor. The gas sensor 10, a memory 20 and a controller 30 are mounted in a portable electronic device 50 such as cellular phone or smart phone, PDA, IOT devices etc.

The gas sensor 10, the memory 20 and the controller 30 together constitute the air-quality sensing system 100. The memory 20 and the controller 30 are parts of the portable electronic device 50.

The air-quality sensing system 100 operates in an ultra-low power mode when the portable electronic device 50 is inactive. The air-quality sensing system 100 operates in a normal power mode, when the portable electronic device 50 is active. Data sampling rate is higher in normal power mode compared to the data-sampling rate in the ultra-low power mode. For instance, the resistance measurement is done may be every 300 seconds in ultra-power mode, while the resistance measurement is done at every 3 seconds in a normal power mode. As a result, the power required to heat the gas sensor 10 during normal power mode is higher than the power required during the ultra-low power mode.

The memory 20 stores a baseline resistance value of the gas sensor 10 in the ultra-low power mode. The baseline resistance value is a maximum resistance value measured over a specific period by the gas sensor 10. The baseline resistance value is not a sudden peak or maximum value, which might have occurred for a short period. Whereas, it is a consistent maximum resistance value observed over a long period.

During ultra-low power mode, the gas sensor 10 is heated not frequently as compared to the normal power mode. Whenever the gas sensor 10 is heated, it measures the resistance value over a period. Based on this measurement, the baseline resistance value of the gas sensor 10 in the ultra-power mode is determined and stored in the memory 20.

A controller 30 transitions air-quality sensing system 100 to a normal power mode, when the portable electronic device 50 in active. The controller 10 computes rate of stabilization of resistance value of the gas sensor 10 in the normal power mode.

When the portable electronic device 50 is active, the user expects the air-quality reading to appear in the screen immediately. However, the actual measurement of resistance or the air-quality may take more time, as the gas sensor 10 needs to be heated and stabilized.

During initial activation period of the gas sensor 10 in normal power mode, a rate of stabilization of resistance value of the gas sensor 10 is computed by the controller 30 using forecasting techniques. The controller 30 estimates stabilized resistance value of the gas sensor 10 in the normal power mode based on the rate of stabilization of resistance value of the gas sensor 10 in the normal power mode, the baseline resistance value in the ultra-low power mode and a comparison chart of stabilized resistance values of the gas sensor in the ultra-low power mode and the normal power mode.

The stabilized resistance values of the gas sensor 10 in the ultra-low power mode and the normal power mode are collected over a period and analyzed to make the comparison chart. This comparison chart of stabilized resistance values of the gas sensor 10 in the ultra-low power mode and the normal power mode is stored in the memory 20 beforehand.

The estimated stabilized resistance value of the gas sensor 10 indicates the quality of ambient air. The estimated stabilized resistance value of the gas sensor 10 in the normal power mode is output to a user of the portable electronic device 50. Thus, the disclosure is able to solve the purpose of providing the air quality measurement to the user in a very short time, while also save the power remarkably. Therefore, the user experience of air-quality feature of the portable electronic device is improved remarkably. Once the gas sensor stabilizes in the normal power mode, an actual stabilized resistance value of the gas sensor in the normal power mode is output.

Figure 1B:
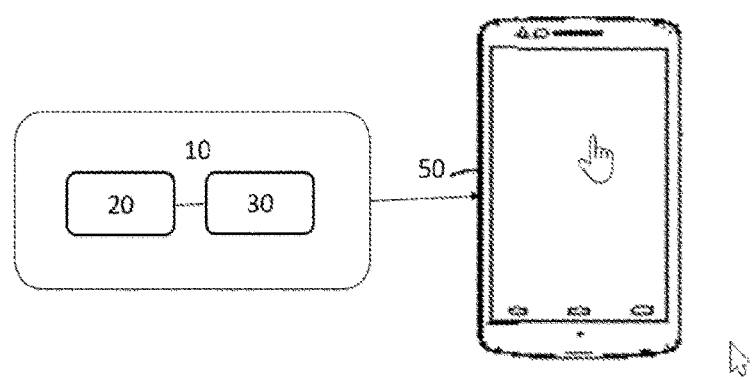
FIG. 1b illustrates a schematic block diagram of air-quality sensing system, according to another embodiment of the present disclosure.

In another embodiment of the disclosure, the air-quality sensing system 100 itself is called as the gas sensor 10. FIG. 1b illustrates a schematic block diagram of air-quality sensing system, according to this embodiment of the present disclosure In this embodiment, the memory 20 and the controller 30 are provided in the gas sensor 10. The gas sensor 10 is mounted to the portable electronic device 50. Rest of the functionalities and aspects are same as explained in the previous paragraphs.

Figure 2:
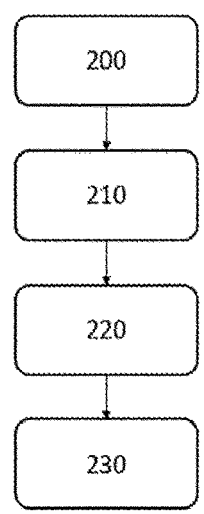
FIG. 2 shows a flow chart illustrating the steps involved in a method of operating a gas sensor in a portable electronic device, according to an embodiment of the present disclosure.

FIG. 2 shows a flow chart illustrating the steps involved in a method of operating a gas sensor in a portable electronic device, according to an embodiment of the present disclosure. The gas sensor 10 can be a metal oxide gas sensor. The gas sensor 10 operates in an ultra-low power mode when the portable electronic device 50 is inactive and the gas sensor 10 operates in a normal power mode when the portable electronic device 50 is active. Data sampling rate is higher in normal power mode compared to the data-sampling rate in the ultra-low power mode.

The method involves storing a baseline resistance value of the gas sensor 10 in the ultra-low power mode at step 200. As explained in earlier paragraphs, the baseline resistance value of the gas sensor 10 in the ultra-low power mode is the maximum resistance value obtained consistently over a specific period. The gas sensor 10 transitions to a normal power mode from the ultra-power mode at step 210.

At step 220, a rate of stabilization of resistance value of the gas sensor 10 is computed in the normal power mode using forecasting techniques. At step 230, a stabilized resistance value of the gas sensor 10 in the normal power mode is estimated based on the rate of stabilization of resistance value of the gas sensor in the normal power mode, the baseline resistance value in the ultra-low power mode and a comparison chart of stabilized resistance values of the gas sensor in the ultra-low power mode and the normal power mode.

The comparison chart of stabilized resistance value of the gas sensor 10 in the ultra-low power mode and normal power mode is created and stored beforehand in a memory 20. The estimated stabilized resistance value of the gas sensor indicates the quality of ambient air. The estimated stabilized resistance value of the gas sensor in the normal power mode is output to a user of the portable electronic device 50.

Since the stabilized resistance value of the gas sensor in normal power mode is estimated quickly, the air-quality reading can be output the user within a very short time. As the response from the portable electronic device is quick, user satisfaction is improved remarkably. Air-quality measurement is done rapidly without wasting extra power. As the power requirement for the air-quality measurement is reduced, power can be used for some critical functions in the portable electronic device.

Once the gas sensor becomes stabilized in the normal power mode, an actual stabilized resistance value of the gas sensor in the normal power mode is output.

It should be understood that embodiments explained in the description above are only illustrative and do not limit the scope of this disclosure. Many such embodiments and other modifications and changes in the embodiment explained in the description are envisaged. The scope of the disclosure is only limited by the scope of the claims.

What we claim:

1. A method of operating a gas sensor in a portable electronic device, said gas sensor is configured to operate in a ultra-low power mode when said portable electronic device is inactive and said gas sensor is configured to operate in a normal power mode when said portable electronic device is active, said method comprising:
   storing a baseline resistance value of said gas sensor in said ultra-low power mode;
   transitioning said gas sensor to a normal power mode;
   computing a rate of stabilization of resistance value of said gas sensor in said normal power mode; and
   estimating a stabilized resistance value of said gas sensor in said normal power mode based on said rate of stabilization of resistance value of said gas sensor in said normal power mode, said stored baseline resistance value in said ultra-low power mode, and a comparison chart of stabilized resistance values of said gas sensor in said ultra-low power mode and said normal power mode.

2. The method as claimed in claim 1, wherein the stabilized resistance value of said gas sensor indicates quality of ambient air.

3. The method as claimed in claim 1, further comprising:
   outputting the estimated stabilized resistance value of said gas sensor in said normal power mode.

4. The method as claimed in claim 1, wherein said comparison chart of stabilized resistance value of said gas sensor in said ultra-low power mode and normal power mode is created and stored before transitioning said gas sensor to a normal power mode.

5. The method as claimed in claim 1, further comprising:
   outputting an actual stabilized resistance value of said gas sensor in said normal power mode, once said gas sensor becomes stabilized in said normal power mode.

6. The method as claimed in claim 1, wherein a data sampling rate is higher in normal power mode compared to a data sampling rate in said ultra-low power mode.

7. An air-quality sensing system for a portable electronic device, wherein said air-quality sensing system operates in an ultra-low power mode when said portable electronic device is inactive and said air-quality sensing system operates in a normal power mode when said portable electronic device is active, said air-quality sensing system comprising:
   a gas sensor;
   a memory storing a baseline resistance value of said gas sensor in said ultra-low power mode; and
   a controller configured to
      transition said air-quality sensing system to a normal power mode, when said portable electronic device is active;
      compute a rate of stabilization of resistance value of said gas sensor in said normal power mode; and
      estimate a stabilized resistance value of said gas sensor in said normal power mode based on said rate of stabilization of resistance value of said gas sensor in said normal power mode, said stored baseline resistance value in said ultra-low power mode, and a comparison chart of stabilized resistance values of said gas sensor in said ultra-low power mode and said normal power mode.

8. The air-quality sensing system as claimed in claim 7, wherein the controller is further configured to output the estimated stabilized resistance value in said normal power mode.

9. The gas sensor as claimed in claim 8, wherein the estimated stabilized resistance value of said gas sensor indicates quality ambient air.

10. The air-quality sensing system as claimed in claim 7, wherein said comparison chart of stabilized resistance value of said gas sensor in said ultra-low power mode and normal power mode is created and stored in said memory before transitioning said gas sensor to a normal power mode.

* * * * *